United States Patent  [11] 3,575,223

[72] Inventors Gerhard Hickel
 Frankfurt, Main;
 Manfred Michaelis, Langen, Germany
[21] Appl. No. 738,253
[22] Filed June 19, 1968
[45] Patented Apr. 20, 1971
[73] Assignee Braun Aktiengesellschaft
 Frankfurt, Main, Germany
[32] Priority June 23, 1967
[33] Germany
[31] B93150

[54] ELECTRICALLY DRIVEN JUICE EXTRACTOR
 10 Claims, 2 Drawing Figs.
[52] U.S. Cl. .................................................... 146/3
[51] Int. Cl. .................................................... A47j 19/02
[50] Field of Search .......................................... 146/3, 3.3,
 3.4, 3.5, 3.6, 3.7, 3.11

[56] References Cited
 UNITED STATES PATENTS
3,016,075 1/1962 Mantelet ..................... 146/3.7

FOREIGN PATENTS
1,164,041 2/1964 Germany ...................... 146/3.7
 411,252 11/1966 Switzerland ................. 146/3.7

Primary Examiner—Andrew R. Juhasz
Assistant Examiner—F. R. Bilinsky
Attorney—Michael S. Striker ABSTRACT: A juicer includes an electromotor having a rotatable drive shaft. A smaller first conical extracting member provided with external ribs is connected with the drive shaft for rotation thereby. A removable larger second conical extracting member provided with external ribs is telescopable over the first extracting member to be connected therewith for rotation. The second extracting member is connected with the first extracting member if larger quantities of juice are to be extracted. Wall means defines an annular channel-shaped first compartment arranged so that juice extracted by the first extracting member is collected therein, and a second compartment arranged either to receive juice extracted by the second extracting member when the same is connected with the first extracting member and is in use or to receive juice extracted from the first extracting member when the first receptacle is overflowing.

PATENTED APR 20 1971

3,575,223

Inventors
GERHARD HICKEL
MANFRED MICHAELIS

By: Michael S. Striker
Attorney

ELECTRICALLY DRIVEN JUICE EXTRACTOR

BACKGROUND OF THE INVENTION

The present invention relates to an electrically driven implement in general, and more particularly to an electrically operated juicer. Still more specifically, the present invention relates to an electrically operated juice extractor for extracting juice from citrus fruit and the like.

Citrus and other fruits of an analogous nature from which juice is to be extracted come in various different sizes, ranging from very small limes to rather large grapefruit and beyond. To facilitate the extraction of juice from such fruits it is known to provide electrically driven juice extractors, so-called juicers. Basically, these comprise a substantially conical extracting member which on its exterior circumferential surface is provided with projecting ribs. This is mounted for rotation about its axis on or in operative connection with the drive shaft of an electromotor, and the citrus fruit from which juice is to be extracted is pressed onto the tip of the extracting member whereupon the latter squeezes juice from the fruit in response to being rotated by the electromotor. The juice such obtained is collected in a receptacle forming a part of the juicer device.

Known devices of this type are very efficient in the extraction of the juice. The manner in which they must be handled is, however, less efficient. More specifically, in known devices of this type all constituent components become equally involved, regardless of whether a large quantity of juice is to be obtained or whether the quantity required is minute. Evidently, a large grapefruit will yield considerably more juice than for instance a small lime. Known devices of the type in question make no provision for this disparity and therefore the entire device is to be cleaned after every use, regardless whether it was employed only for obtaining a very small quantity of juice or whether it was employed for obtaining a very large quantity of juice. This is evidently a disadvantage, to which may be added the further drawback that if a very small quantity of juice is collected in the relatively large juice receptacle of known devices of this type, a significant amount of this small quantity will be lost by reason of its adherence to the walls of the receptacle and because of other problems.

For all of these reasons it is an object of the present invention to overcome the aforementioned disadvantages.

A further object of this invention is to provide an implement of the type here in question which is equally well suited for extracting very small and for extracting much larger quantities of juice and which requires, after each use, only an amount of cleaning commensurate with the size of the task which has been performed; in other words, if a large amount of juice has been extracted than a larger amount of cleaning will be required but if a small amount of juice has been extracted than only a small amount of cleaning will be required.

Furthermore, it is an object of the invention to provide such an implement wherein the loss of juice from small quantities of extracted juice is reduced as much as possible.

SUMMARY OF THE INVENTION

In accordance with the aforementioned comments, and others which will become apparent hereafter, one feature of our invention resides in the provision as an electrically driven implement, and more particularly a juice extractor for extracting juice from citrus fruit and the like, which comprises an electromotor having a rotatable drive shaft, and a smaller first extracting member connected with this drive shaft for rotation thereby. At least one removable larger second extracting member is arranged to be coupled at the will of a user with the first extracting member so as to rotate with the same. The first extracting member is adapted for extracting relatively small quantities of juice during rotation from fruit brought into contact with its outer circumferential surface, and similarly the second extracting member is arranged for extracting larger quantities of juice from fruit under the same circumstances. However, when the second extracting member is in use the first extracting member will not be in use. We further provide means which define a first and a second compartment of which the first has smaller and the second a larger volumetric capacity. The compartments are so arranged as to receive extracted juice from the first and the second extracting member, respectively. If large quantities of small fruits are extracted the large compartment receives extracted juice from the first extracting member too.

By resorting to our invention as outlined by way of example above, smaller quantities of juice can be extracted—for example from a small lime or small lemon—with the smaller first extracting member, and this juice will then be received in the first compartment which, as pointed out above, has a smaller volumetric capacity than the second compartment. Thus there will be no need to subsequently clean the second compartment under these circumstances, and the loss of juice resulting from adherence of the liquid to the walls is significantly smaller because the available wall space is less in the first compartment by virtue of the smaller volumetric capacity thereof.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

DESCRIPTION OF THE PREFERRED EMBODIMENTS

Figure 1:
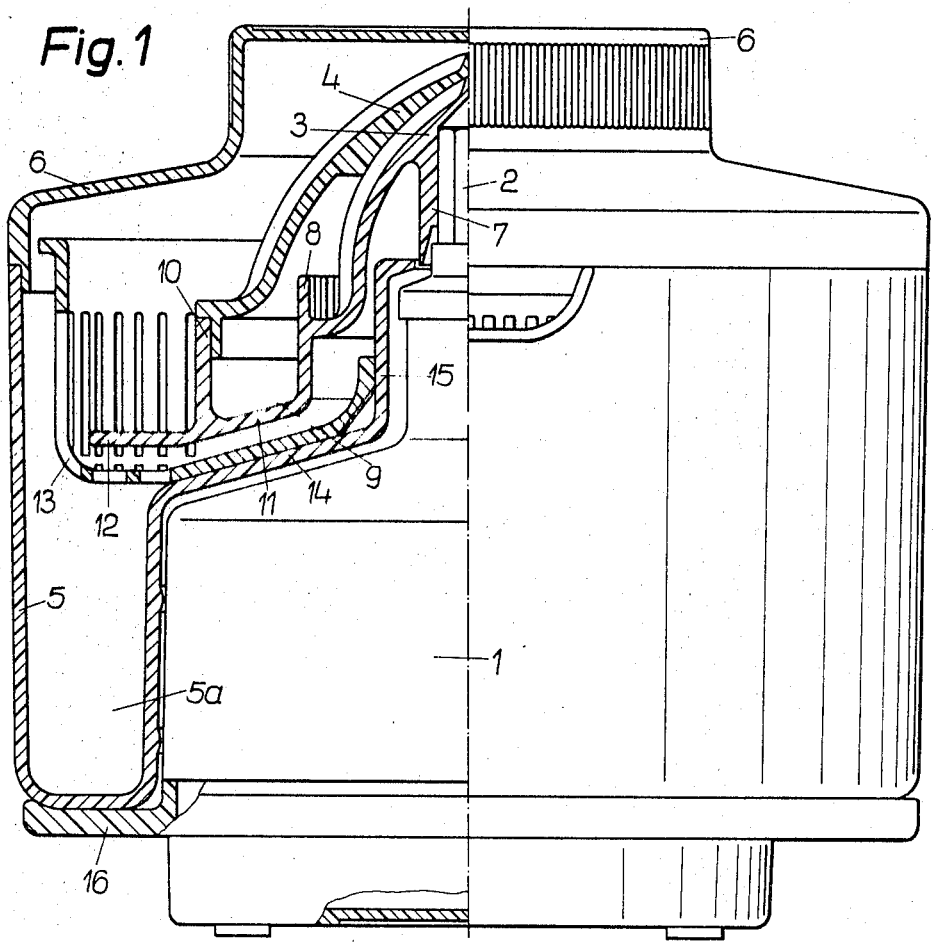
FIG. 1 is partially sectioned side elevational view of an implement embodying the present invention.
Figure 2:
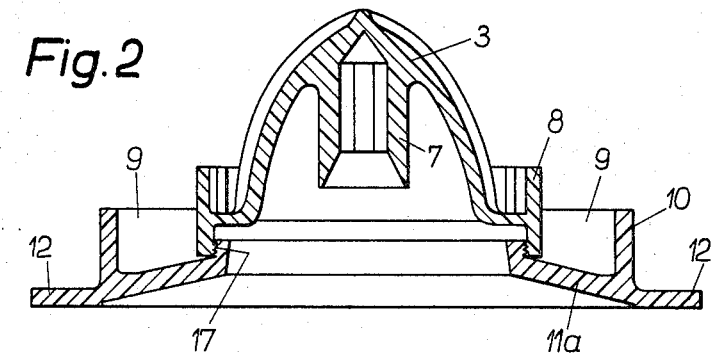
FIG. 2 is an axial section through an extracting member for use in the implement shown in FIG. 1.

The implement illustrated in FIG. 1 comprises a schematically shown electromotor 1 whose output shaft is not shown but is coupled in known manner with a vertically extending rotatable drive shaft 2, here assumed to be of hexagonal cross section. A first extracting member 3 is coupled with the drive shaft 2 for rotation therewith. FIG. 2 shows more clearly the construction and the configuration of this first extracting member 3, it being evident that the same is hollow and of generally conical configuration It is provided in its interior with a substantially sleeve-shaped inner projection 7 having a recess so dimensioned as to receive the drive shaft 2, it being evident that there must be no rotation of the drive shaft 2 with reference to the member 3.

The external configuration of the member 3 is conventional to the extent that the member 3 is provided on its outer circumferential surface with a plurality of projecting ribs—which are not separately illustrated—onto which the citrus fruit is pressed over the tip of the member 3. In accordance with the invention the base region of the member 3 is provided with wall means which defines an upwardly open annular channel. In the case of FIG. 1 this wall means is identified with reference numeral 11 and defines the annular upwardly open channel 9. Upwardly above the channel 9 the member 3 is provided with a circumferential annulus 8 of teeth which serve as a sieve for pieces of fruit meat, seeds and the like. At the radially outer side of the channel 9 the wall means extends upwardly and constitutes a bead 10 whose purpose will be described hereafter. Furthermore, a radially outwardly extending projection 12 is provided, and this may be in form of an annular flange, of single fingerlike projection or of a plurality of angularly spaced projections. The purpose of this will also still be described.

In accordance with the invention at least one additional and larger extracting member 4 is provided which can be coupled with the member 3 for rotation therewith at any time and at the will of the user. The member 4 will be utilized only when larger quantities of juice are to be extracted. It is also hollow and of a configuration substantially similar to that of FIG. 2, except for the wall means defining the channel 9, the bead 10 and the projection 12. The member 4 is also provided with the exterior ribs mentioned before and it is hollow as the member 3 without, however, being provided with the sleevelike projection 7. Instead, the member 4 is of an interior configuration which is at least in the region of the upper portion of the member 4 complementary to the exterior configuration of the member 3 so that, when the member 4 is telescoped over the member 3, it will be connected therewith so as to share the rotation of the member 3 without performing relative movements with reference to the member 3. FIG. 1 shows that the bead on the member 3 serves to center the member 4 thereon when it is telescoped over the member 3.

Whereas the annular channel 9 is arranged to receive juice extracted by the member 3, and only by the member 3, the wall means 5 defines a compartment 5a which is arranged to receive juice extracted by the member 4, and if large quantities of small fruits are extracted the compartment 5a receive extracted juice from the member 3 too. The wall means 5 defines not only the compartment 5a but constitutes at the same time a housing surrounding the various components of the device and being closed at its upper end by a cover or lid 6. A sieve basket 13 is supported on an upwardly converging wall portion 14 of the wall means 5 and is centered by substantially cylindrical wall portion 15 which in turn is guided by and rests on the housing of the electromotor 1. An annular ring or flange 16, which may be integrally formed with the housing of the electromotor 1 extending radially therefrom, serves as the main support for the wall means 5.

From what has been said thus far the purpose the radially extending projection 12 on the member 3 will now be clear. FIG. 1 shows that the projection 12 is located with some spacing upwardly above the bottom of the sieve basket 13 and, being of one-piece construction with the wall means 11, the projection 12 will of course rotate when the member 3 rotates, thus constantly displacing any particular material which may have reached the interior of the basket 13, such as pieces of fruit meat, seeds and the like, and keeping the apertures of sieve open so that liquid may flow into the compartment 5a.

As mentioned before, the member 3 is used by itself if only small quantities of juice are to be extracted, and this juice will then flow into and be collected in the channel 9. It can be readily recovered therefrom by lifting the member 3 off the drive shaft 2 and pouring the juice from the channel 9 into a suitable receptacle. Used in this manner it is necessary only to clean the member 3 with its associated wall means 11 whereas the sieve basket 13 and the wall means surrounding and defining the compartment 5a do not become soiled and thus require no cleaning.

If, however, larger quantities of juice are to be extracted, then the larger member 4 is telescoped over the member 3, thereby connected with the same for rotation together with the member 3. The member 4 is thus centered with reference to the member 3 by the bead 10 of the latter and, inasmuch as the base region of the member 4 overlies the channel 9, juice extracted by the member 4 cannot flow into the channel 9 but can flow only into the sieve basket 13 and from there to the compartment 5a.

As is conventional with juice extractors of the type here under discussion, the drive arrangement may be so constructed that the motor 1 will be energized whenever a fruit from which juice is to be extracted is pressed onto the tip of the respective extracting member 3 or 4. How this is accomplished is well known in the art and need not be described, particularly because it does not form a part of the invention and is being mentioned only for the sake of clarity.

It will be appreciated that various modifications of the embodiment illustrated in FIG. 1 are possible and come within the scope of the present invention. Thus, wall means 11 need not be of one-piece construction with the member 3. Instead, it may be constructed as a separate member 11a as shown in FIG. 2 and may be screw threadedly secured to the member 3, as indicated by the reference numeral 17 in FIG. 2. In all other respects the embodiment shown in FIG. 2 is identical with the member 3 shown in FIG. 1.

Again, it is clear that wall means corresponding to the wall means 11—or 11a—of the member 3 may also be provided on the member 4 if desired, particularly if yet a further extracting member should be provided which could also be coupled with the members 3 and 4 in the manner described for relative to the connection of member 4 with member 3.

It will be appreciated that the construction outlined herein is not only very efficient in attaining its intended purpose, but is also very simple and therefore inexpensive to manufacture. Yet, it provides increased efficiency in the extraction of juices and the handling of the extracted liquid, while requiring less cleaning and maintenance than was necessary heretofor.

It will be understood that each of the elements described above, or two or more together, may also find a useful application in other types of constructions differing from the types described above.

While the invention has been illustrated and described as embodied in a juice extractor, it is not intended to be limited to the details shown since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

We claim:

1. An electrically driven implement, particularly a juice extractor for extracting juice from citrus fruit and the like, comprising in combination: a housing means; an electromotor arranged in said housing means and having a rotatable drive shaft; a smaller first extracting member connected with said drive shaft for rotation thereby and adapted for extracting relatively small quantities of juice during such rotation from fruit brought into contact with said first extracting member; at least one removable larger second extracting member adapted to be placed over said first extracting member; means for attaching said removable larger second extracting member to said first extracting member when placed over the same so as to rotate with said first extracting member for extracting larger quantities of juice during such rotation from fruit brought into contact with said second extracting member; and compartment-defining means defining a first and a second compartment respectively having a smaller and a larger volumetric capacity, said first compartment being arranged for receiving extracted juice from said first extracting member, and said second compartment being arranged for receiving extracted juice at least from said second extracting member.

2. An implement as defined in claim 1, wherein said extracting members are respectively of substantially conical configuration, each of said extracting members having an outer circumferential surface provided with a plurality of projecting juicing ribs.

3. An implement as defined in claim 1, said extracting members each being of hollow substantially conical configuration and each having an outer circumferential surface provided with a plurality of projecting juicing ribs, said larger second extracting member being telescopable over said smaller first extracting member.

4. An implement as defined in claim 3, each of said members having a base region, and said compartment-defining means comprising first wall means defining a channel-shaped annular first receptacle of smaller volumetric capacity provided on said first member surrounding the latter at said base region thereof and arranged to receive extracted juice from said first member, and second wall means defining a second receptacle of larger volumetric capacity separate from said first receptacle and arranged to receive juice extracted from said second member when the same is telescoped over and attached to said first member for rotation therewith or to receive juice extracted from said first member when said first receptacle is overflowing.

5. An implement as defined in claim 4, said second member being constructed and arranged so that the base region thereof overlies and covers said first receptacle when said second member is telescoped over said first member.

6. An implement as defined in claim 4, said first wall means being integral with said first extracting member.

7. An implement as defined in claim 4, said first wall means being removably connected with said first extracting member.

8. An implement as defined in claim 3, said first extracting member having a predetermined outer contour, and said second extracting member having an interior contour complementary to said outer contour of said first extracting member.

9. An implement as defined in claim 4, said second wall means surrounding said motor and said members and constituting a portion of said housing means.

10. An implement as defined in claim 5, said first wall means comprising a projecting annular circumferential bead, and said base region of said second extracting member engaging said bead when said second extracting member is telescoped over said first extracting member whereby the former is centered on the latter.